United States Patent [19]

Twerdochlib et al.

[11] Patent Number: 5,479,826
[45] Date of Patent: Jan. 2, 1996

[54] MICROWAVE SYSTEM FOR MONITORING TURBINE BLADE VIBRATION

[75] Inventors: Michael Twerdochlib; Robert J. Beeson, both of Oviedo; David E. Bateman, Geneva; Paul F. Rozelle, Fern Park; John F. DeMartini, Lake Mary, all of Fla.

[73] Assignee: Westinghouse Electric Corporation, Pittsburgh, Pa.

[21] Appl. No.: 262,108

[22] Filed: Jun. 17, 1994

[51] Int. Cl.$^6$ ............................ G01N 29/00; G01N 17/00
[52] U.S. Cl. ................................................ 73/660; 73/630
[58] Field of Search .......................... 73/660, 659, 462, 73/680; 342/118; 340/681, 683

[56] References Cited

U.S. PATENT DOCUMENTS

| | | | |
|---|---|---|---|
| 4,080,823 | 3/1978 | Stargardter | 73/665 |
| 4,413,519 | 11/1983 | Bannister | 73/660 |
| 4,507,658 | 3/1985 | Keating | 342/118 |
| 4,887,468 | 12/1989 | Kendree | 73/660 |

*Primary Examiner*—Hezron E. Williams
*Assistant Examiner*—Christine K. Oda
*Attorney, Agent, or Firm*—M. G. Panian

[57] ABSTRACT

A method for monitoring turbine blade vibrations comprises the step of transmitting a continuous wave of microwave energy toward a rotating row of blades. Each passage of an individual blade tip through the path of the continuous wave produces a signal indicative of the time at which each passage occurs. The signal is then monitored and analyzed to detect blade vibrations. The signal can be based on a standing wave or a reflected wave.

10 Claims, 5 Drawing Sheets

5,479,826

MICROWAVE SYSTEM FOR MONITORING TURBINE BLADE VIBRATION

BACKGROUND OF THE INVENTION

The present invention relates generally to apparatus and methods for measuring vibration in rotating turbine blades. More particularly, the invention relates to a turbine blade vibration monitoring system employing microwaves.

In the design and operation of a turbine, care must be taken to ensure that no turbine blades are set into vibration during rotation of the one or more blade rows commonly employed. Vibration of a blade sets up fluctuating stresses that can damage or severely reduce the life of the blade. Various means exist to measure these fluctuating stresses while the turbine is in operation. For example, in one arrangement, strain gauges are bonded to the turbine blades and signals from the gauges are transmitted to data acquisition and recording equipment by means of telemetry techniques. This arrangement presents problems with respect to the life of the strain gauges, the number of strain gauges that may be employed, and the cost of the telemetry channels.

Magnetic reluctance (variable reluctance) and eddy current sensors have also been employed to monitor turbine blade vibration. Briefly, reluctance sensors employ a magnet and a coil to detect changes in flux through the magnet when a blade passes and reduces the resistance (reluctance) to the flux. Eddy current sensors employ a coil that is placed in oscillation (resonance) at about 1.6 MHz. When a blade passes, the oscillating field sets up a current (eddy) in the blade metal, which then induces an oscillating field that is picked up by the coil. However, these techniques pose problems.

With regard to bandwidth, the blade vibration monitor (BVM) sensor must support the time resolution of the BVM zero crossing board. (The zero crossing board contains a circuit that outputs a pulse for each blade passage.) For example, one presently available zero crossing board operates at 24 MHz. This bandwidth is expected to increase to 100 MHz with the use of gate array technology. The eddy current sensor operates with a search frequency (i.e., oscillating frequency of the coil) of 1.6 MHz. This is theoretically insufficient for even the 24 MHz zero crossing board. However, the eddy current sensor has been used to support field tests on titanium blades and on steel blades where high residual magnetism has rendered the variable reluctance sensor completely ineffective. The reason the eddy current sensor works at all is believed to be due to the random occurrence of the blade pass pulses with respect to the zero crossing board clock.

Blade capture depth refers to the distance between the BVM sensor and the blade tips. This distance must be small enough to produce a strong signal but large enough so that the blades do not hit the sensor during startup, when the blades grow quickly due to thermal expansion. The variable reluctance sensor will operate at a blade capture depth of 0.200 inch (0.5 cm). The actual gap between sensor and blade tip might be 0.150 inch (0.4 cm) to accommodate variations in blade length with speed and temperature. This is satisfactory for some applications. However, to achieve greater design flexibility, it would be advantageous to provide greater working distance. The eddy current sensor blade capture depth is 0.125 inch (0.3 cm) and is currently used with a blade gap of 0.100 inch. This may present problems due to differential blade expansion during turbine start-up.

The eddy current sensor is also sensitive to profile tipped blades, which produce a disastrous double pulse.

In addition, a very hard electrically non-conductive ceramic shield is required around the eddy current sensor to protect it from erosion. Such shields are brittle and difficult to install.

A known millimeter wave radar system measures turbine blade vibration by directing a narrow beam of millimeter wave pulses toward the rotating blade row and analyzing the pulses reflected from the blades to detect any abnormal vibration. U.S. Pat. No. 4,413,519, Nov. 8, 1983, titled "Turbine Blade Vibration Detection Apparatus," discloses this system. The disclosed system is depicted in FIGS. 1–3 attached hereto. Referring to FIG. 1, a plurality of radar sensors S are utilized for determining blade vibration in one or more rotating blade rows. The sensors S are mounted on the casing of a low pressure steam turbine 2 coupled to a generator 4. Two sensors mounted on the outer casing 6 direct their respective radar signals toward the last blade row 8 on the generator end, and two other sensors direct their signals toward the last blade row 8' on the throttle or governor end. Two other sensors direct radar signals toward respective inner blade rows.

FIG. 2 depicts the disclosed mounting for a radar sensor. As shown, the electronics portion 10 of a sensor is mounted on a bracket 12 secured to the outer casing 6. A waveguide 14 carrying electromagnetic energy extends from the electronics to a position adjacent the blade row 8 and in so doing passes through an aperture in the outer casing 6, with the aperture maintaining pressure integrity with a sealing arrangement 18. Within the turbine, the waveguide 14 is enclosed within a waveguide support 20, which in turn is connected to an adjustable support 22 connected to an internal defuser 24.

FIG. 3 is a block diagram of the signal processing circuitry disclosed by the '519 patent. The illustrated circuitry is for two different blade rows examined with two radar sensors per blade row. A first blade counting circuit 30 provides running blade counts on two output lines for two sensor. Another blade counting circuit 31 performs a similar function for the other blade row. Gating circuits G are provided for gating the blade counts and radar signals. A computer provides enabling signals to the gating circuits and analyzes the digitized radar signals. In particular, the computer performs a Fast Fourier transform on the radar signals to obtain a frequency spectrum for each blade.

While overcoming some of the disadvantages of the magnetic reluctance and eddy current techniques described above, the millimeter wave radar system presents problems of its own. For example, the electronic circuitry for transmitting and receiving radar pulses and then analyzing the received pulses to detect vibrations is complex, requiring a mixing of the transmitted and received microwaves to produce a beat containing the velocity of the blades, which must then be removed. The effects of such complexity include reduced reliability, a need for frequent calibration, and high cost. Accordingly, a primary goal of the present invention is to provide a blade vibration monitoring system which, like the millimeter wave radar system, avoids the disadvantages of the magnetic reluctance and eddy current techniques but also has improved accuracy and avoids the complexity and high cost associated with the millimeter wave radar system.

SUMMARY OF THE INVENTION

The present invention provides a relatively simple, reliable, and inexpensive blade vibration monitoring technique that operates at gigahertz frequencies to provide ultra high bandwidth. Presently preferred embodiments of the invention employ no electronic parts within the turbine. For example, a microwave transceiver may be located within a junction box on a guide tube external to the turbine. One benefit of this arrangement is that the transceiver can be removed easily for servicing. Moreover, the invention does not require a sensor positioned above the blade tip. Therefore, the problems outlined above due to the small spacing between the sensor and blade tip are avoided and greater design flexibility is achieved. In addition, the inventive system is immune to residual magnetism, and does not require shielding. Furthermore, the inventive system avoids the complex electronics required by the prior art millimeter wave radar system, and data are more easily analyzed.

A method or system for monitoring turbine blade vibrations in accordance with the present invention comprises the step of, or means for, transmitting a continuous wave of microwave energy toward a rotating row of blades. As described below, each passage of an individual blade tip through the path of the continuous wave produces a signal indicative of the time at which each passage occurs. The signal is then monitored and analyzed to detect blade vibrations.

In one presently preferred embodiment of the invention, the continuous wave is transmitted through a waveguide toward the rotating row of blades. An alternative embodiment employs a notched antenna placed on the end of a coaxial cable carrying the microwaves. A reflected wave is produced when a blade tip is adjacent an aperture of the waveguide. The reflected wave interacts with the transmitted wave to produce a standing wave inside the waveguide. In this embodiment, the signal which is monitored comprises a disturbance in the standing wave resulting from the passage of the blade tip past the aperture. Such a disturbance can be detected, for example, by measuring the current drawn by the transmitter, the voltage drop across a resistor carrying the transmitter current, or any other means for measuring the change in Q of the microwave cavity or tube.

In another preferred embodiment, the signal which is monitored comprises the wave reflected by the blade tips as they pass the waveguide aperture. This reflected wave can be detected, for example, with a microwave detector connected to a hybrid power divider arranged to divert the reflected power to the detector.

In preferred embodiments of the invention, the signal to be monitored comprises a voltage versus time waveform having a plurality of peaks. Each peak corresponds in time to the passage of a blade tip through the path of the continuous wave. According to the invention, the time intervals between peaks are analyzed to yield the desired vibration information.

DETAILED DESCRIPTION OF PREFERRED EMBODIMENTS

Figure 1:
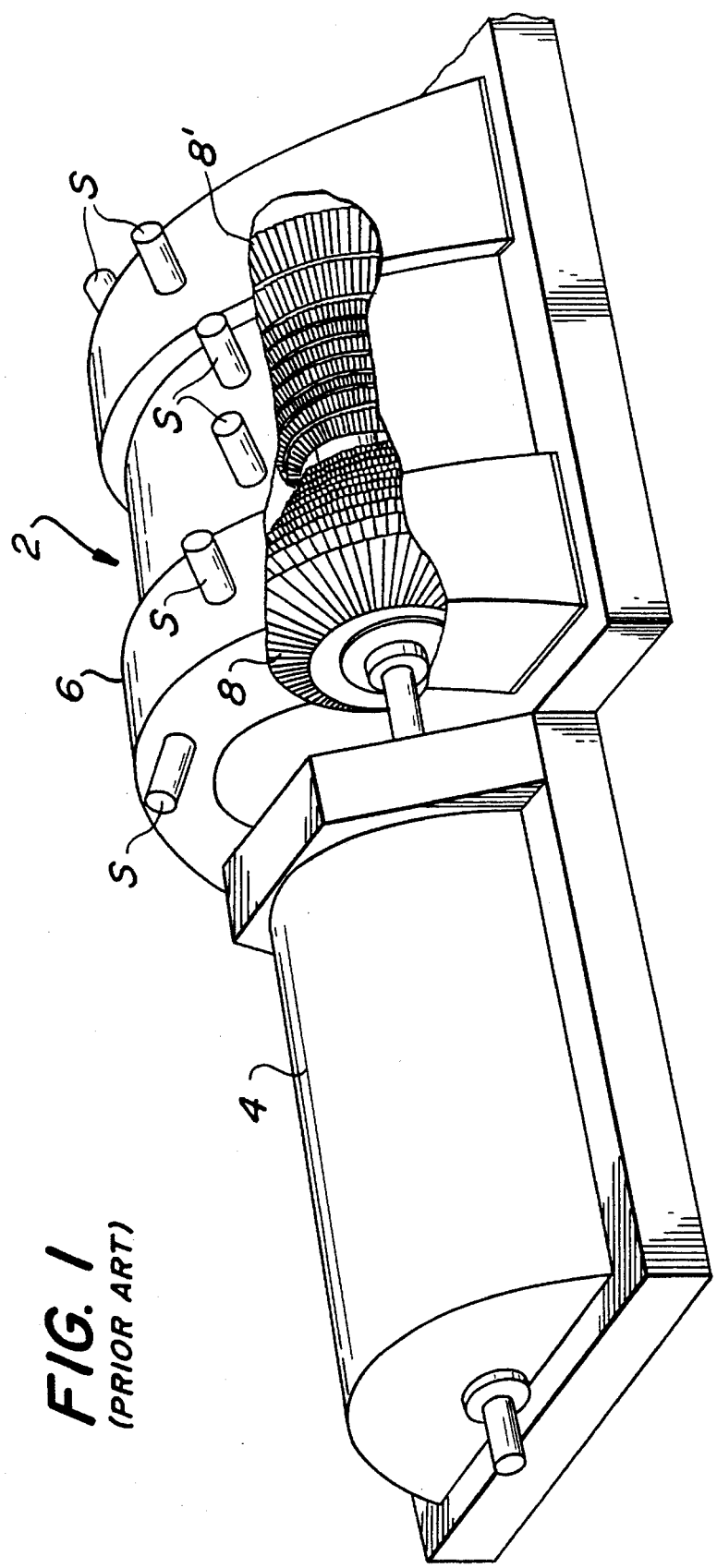
FIG. 1 depicts a prior art millimeter wave radar system for measuring turbine blade vibration.
Figure 2:
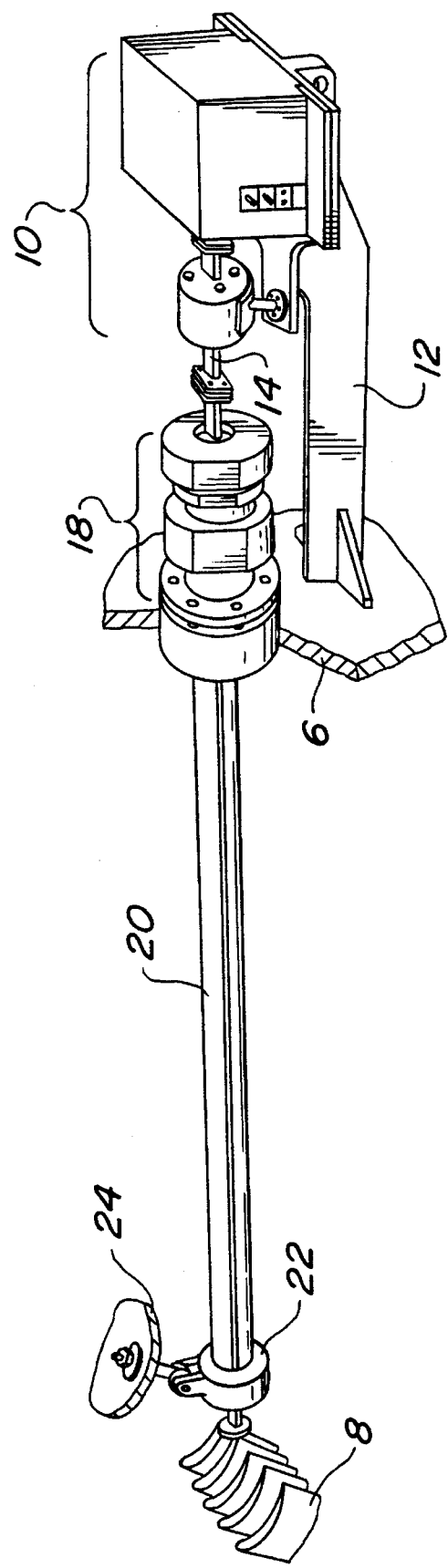
FIG. 2 depicts details of the manner in which the sensors and electronics of the FIG. 1 system are mounted to the turbine.
Figure 3:
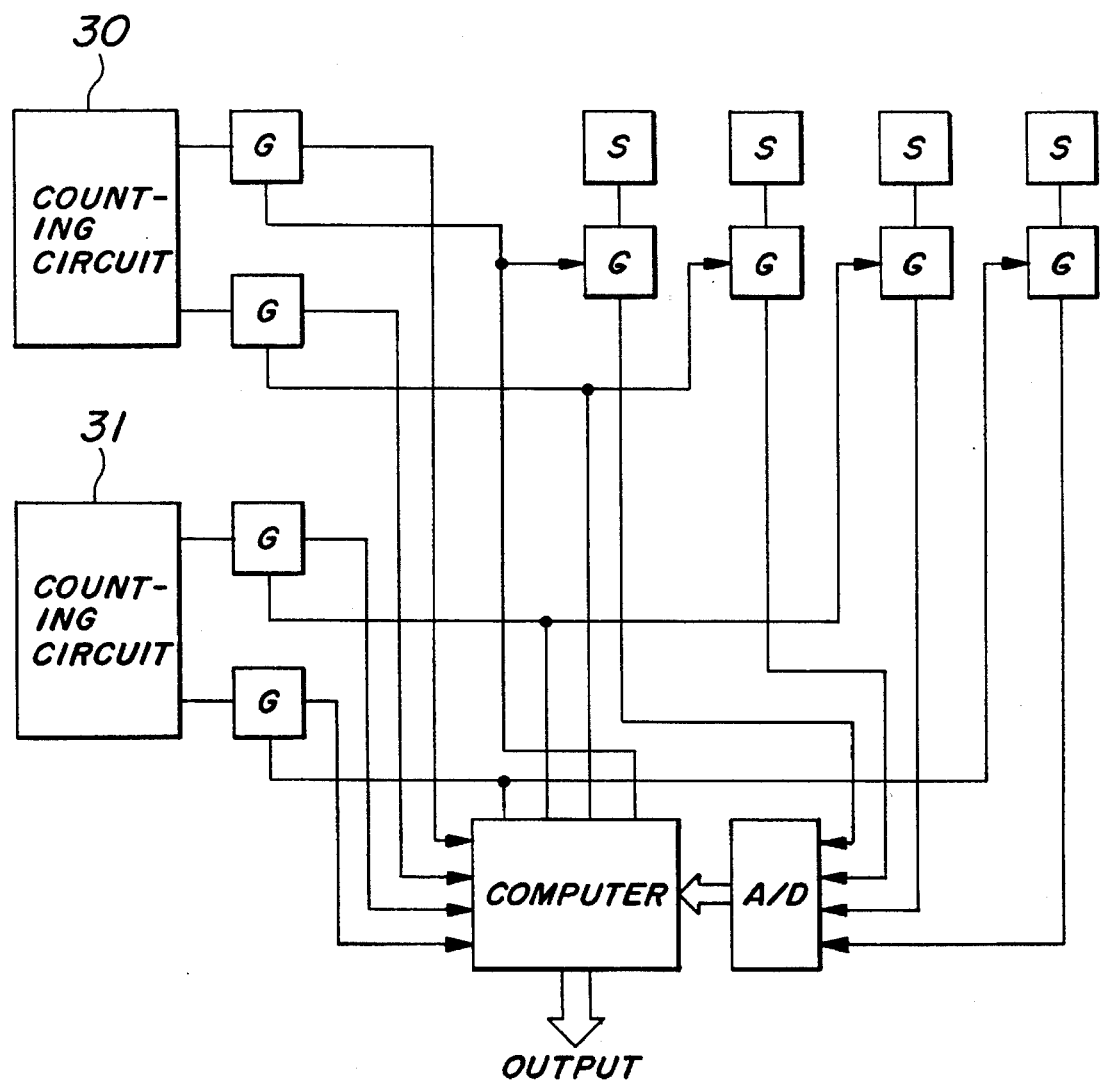
FIG. 3 is a block diagram of the signal processing circuitry of the FIG. 1 system.
Figure 4A:
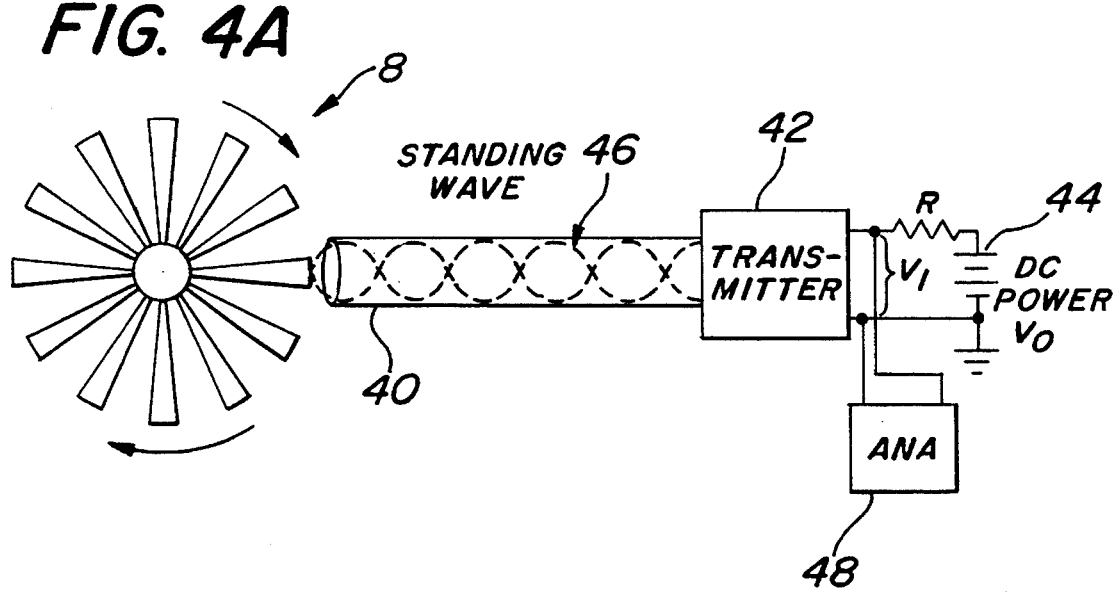
FIGS. 4A–4C schematically depict a standing wave embodiment of a microwave blade vibration monitoring system in accordance with the present invention.
Figure 4B:
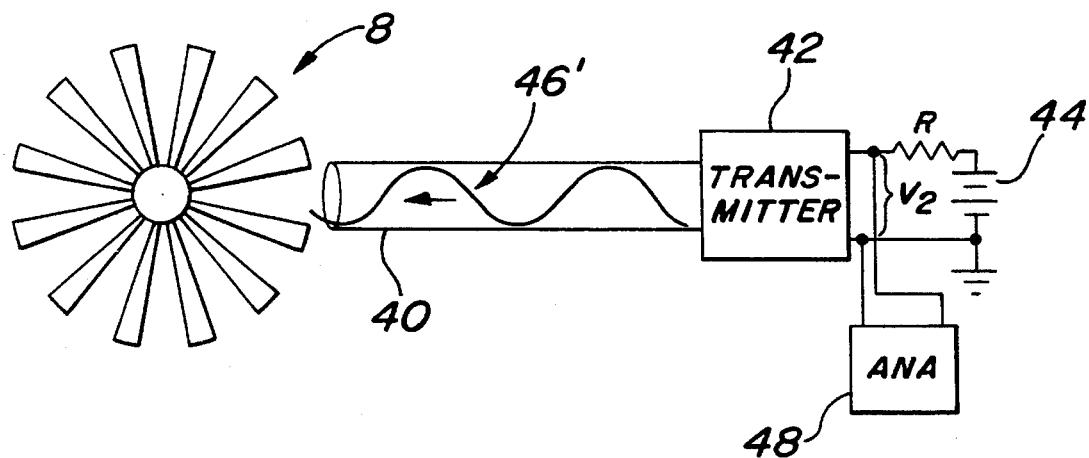
Figure 4C:
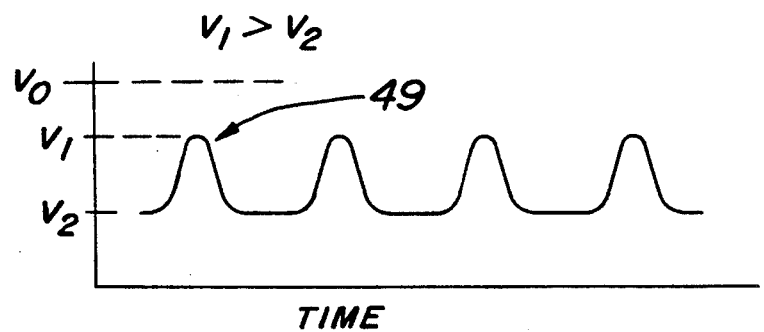

Referring now to FIGS. 4A, 4B and 4C, a standing wave embodiment of the present invention comprises a waveguide 40, a microwave transmitter 42, and a DC power supply 44. A notched antenna placed on the end of a coaxial cable could be employed instead of the waveguide. As shown, the transmitter 42 supplies continuous wave microwave energy to the waveguide. The waveguide is positioned such that an aperture at an end opposite the transmitter is adjacent a rotating row of turbine blades 8. As shown in FIG. 4A, a standing wave 46 is set up inside the waveguide 40 when a blade tip is just outside the aperture. Those skilled in the microwave art will recognize that such a standing wave results from the waveguide length being in integer number of half-wavelengths. Thus, the microwave frequency and the waveguide length may be adjusted as known in the art to allow such a standing wave to exist when the blade tips are just adjacent the waveguide aperture.

As illustrated in FIG. 4B, the standing wave 46 collapses in favor of a traveling wave 46' when there are no blade tips adjacent the waveguide aperture. With a standing wave 46 present, as shown in FIG. 4A, the current drawn by the transmitter 42 through the resistor R is small, resulting in a smaller voltage drop across the resistor R. Thus, the voltage $V_1$ across the transmitter input terminals is larger than the voltage $V_2$ across the transmitter input terminals when there is no standing wave present. This is illustrated in FIG. 4C, which shows a voltage waveform having peaks 49 corresponding to the passage of the blade tips past the waveguide aperture. The voltage waveform rises and falls between the levels $V_2$ and $V_1$. This voltage waveform is monitored by an analyzer 48 as shown in FIGS. 4A and 4B to detect vibrations of the turbine blades. An alternative to monitoring the voltage waveform is to place a detector inside the tube to detect resonance (standing waves). A technique for analyzing the voltage waveform to detect blade vibrations is discussed below.

Figure 5A:
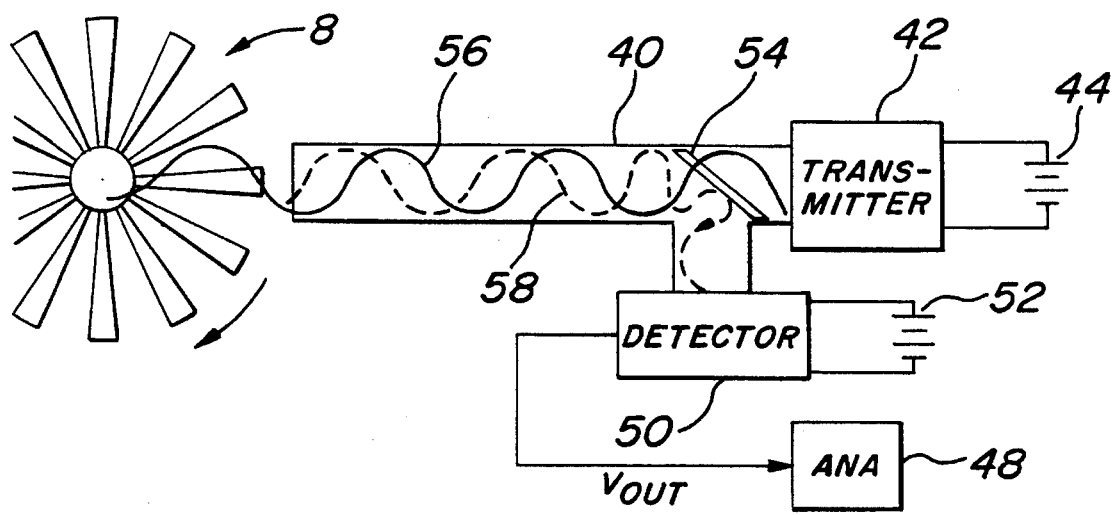
FIGS. 5A–5C schematically depict a reflected wave embodiment of a microwave blade vibration monitoring system in accordance with the present invention.
Figure 5B:
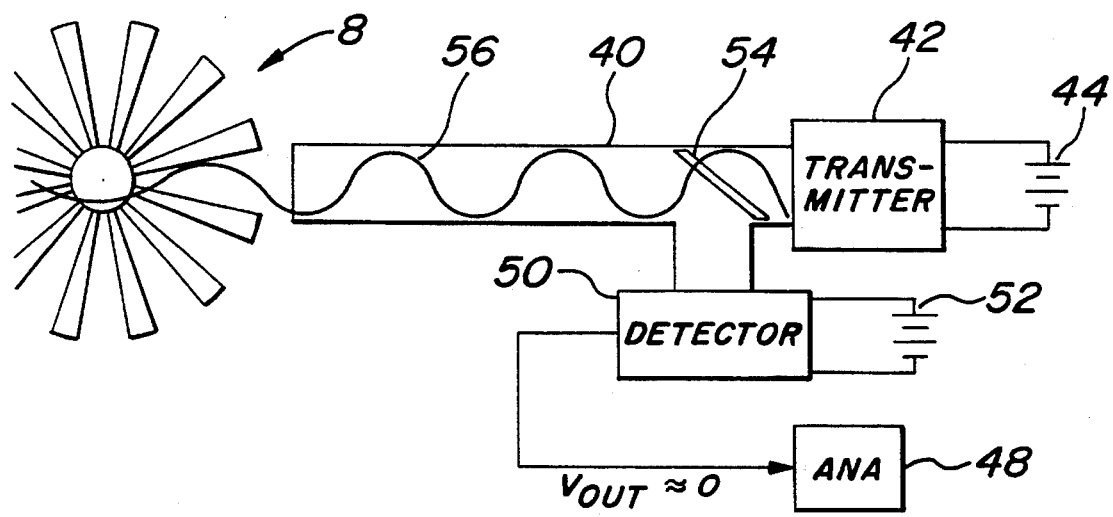
Figure 5C:
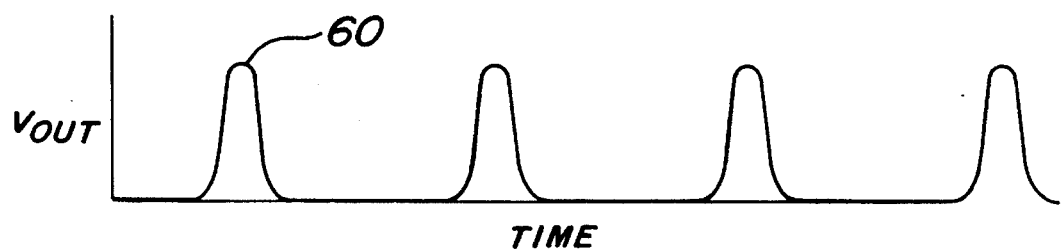

Referring now to FIGS. 5A, 5B, and 5C, a reflected wave embodiment of the present invention includes a detector 50, power supply 52, and a wave splitter or hybrid 54. Those skilled in the art will recognize that when a transmitted wave 56 is reflected by a blade tip, as shown in FIG. 5A, a reflected wave 58 may be diverted from the waveguide 40 to the detector 50. The voltage waveform $V_{out}$ produced by the detector 50 will have peaks 60 that correspond in time to the passage of the blade tips past the open aperture of the waveguide 40. FIG. 5B illustrates the situation wherein the detector output $V_{out}$ drops to approximately 0 when there are no blade tips adjacent the waveguide aperture and the reflected wave all but disappears. The voltage waveform $V_{out}$ may be analyzed to detect blade vibrations in the same manner the waveform V of the standard wave embodiment is analyzed.

As discussed above, the system can function in either of two modes, or a combination thereof: standing wave mode and reflective mode. In the standing wave mode, the waveguide tube functions as an open ended resonant tube tuned to a fixed wavelength (or frequency). A standing wave within the tube depends on the open end of the tube being clear of conductors for a fraction of a half-wavelength (e.g., approximately 0.250 inch). The standing wave collapses as the turbine blades pass the open end of the guide tube. Changes in the standing wave can occur within a microwave cycle (i.e., within a nanosecond or less). Such changes are easily detected, e.g., by (1) a comparison circuit or (2) a zero crossing detection circuit. In connection with the zero crossing detection circuit, the derivative of the BVM sensor signal is taken so that the signal peaks become zero crossings.

Thus, a blade pass signal much like that produced by an eddy current sensor can be produced. The inventive microwave technique and the eddy current technique are similar but the microwave technique is three orders of magnitude faster, eliminating the frequency problems associated with the eddy current sensor. For example, in one presently employed system, the eddy current sensor produces about 300 cycles between blade passes whereas the zero crossing board produces 6000 clock pulses between blade passes. Thus, the eddy current sensor response can vary 20 clock pulses, depending upon where in the eddy current signal the blade top dead center occurs. In contrast, the microwave system can produce 300,000 cycles between blade passes. This dramatically improves the monitor's ability to resolve how much the blade has moved from its rest, or expected, position.

For example, for a 3600 RPM unit, the time required for a blade to complete one revolution is 1 revolution $\times = 60 =1$ cycles per second=0.017 sec. For a unit with 180 blades per row, the time between blade passings is 0.017 sec./180 blades per row=$9.44\times10^{-5}$ sec. between blade passing. An eddy current sensor with a 1.6 MHz search frequency produces $9.44 \times10^{-5}$ sec.$\times$1.6 MHz=151 sensor cycles between blade passings (or 302 for an 1800 RPM unit). In contrast, with a microwave frequency of 1 GHz, there are $9.44\times10^{-5}$ sec.$\times 10^9$ sec.$^{-1}$=$9.4\times10^{-4}$ cycles between blade passings for a 3600 RPM unit. With a zero crossing board clock of 24 MHz, the BVM will produce $9.44\times10^{-5}$ sec.$\times 24\times10^6$ sec.$^{-1}$ =2256 clock pulses between blade passings (for a 3600 RPM unit). Blade vibration causes the measured clock counts to vary about 2256, which variation is measured to detect blade vibration. Thus, the present invention, with its faster clock (e.g., 100 MHz) and higher resolution, provides a "ruler" with smaller divisions. This is significant because it is important to detect very small changes that occur when a blade starts to crack at its root. High resolution is needed to do this.

In the reflected wave mode, the microwave transceiver continuously sends and receives microwave energy through the guide tube. With no blade positioned adjacent the open end of the guide tube, very little microwave energy is reflected back to the transceiver. As the blade approaches top dead center, the reflected wave intensity increases, reaching a maximum at top dead center. Each blade pass produces a pulse similar to the pulse produced in the standing wave mode.

In either mode, each passage of a blade results in a pulse and the number of clock counts between pulses may be plotted over a number of revolutions. Over a number of revolutions, blade vibrations cause the clock count to oscillate about the expected (rest) count. This oscillation is indicative of the amount of vibration.

I claim:

1. A method for monitoring turbine blade vibrations, comprising the steps of:

(a) transmitting a continuous wave of microwave energy towards a rotating row of blades, wherein a reflected wave is produced upon passage of an individual blade tip through the path of said continuous wave such that a standing is produced by an interaction of the transmitted wave with the reflected wave and wherein a disturbance in said standing wave resulting from the passage of said blade tip produces a signal indicative of the time at which each said passage occurs;

(b) monitoring said signal; and (c) analyzing said signal to determine an elapsed time between passages of individual blades through the path of said continuous wave to detect vibrations of said blades.

2. A method as recited in claim 1, wherein said continuous wave is transmitted through a waveguide toward said rotating row of blades; wherein the reflected wave is produced when a blade tip is adjacent an aperture of said waveguide; and wherein said signal comprises said reflected wave.

3. A method as recited in claim 1, wherein said signal comprises a voltage versus time waveform having a plurality of peaks, each peak corresponding in time to the passage of a blade tip through the path of said continuous wave.

4. A method for monitoring turbine blade vibrations, comprising the steps of:

(a) producing a standing wave in a waveguide having an aperture positioned adjacent a rotating row of blades, wherein each passage of an individual blade tip past said aperture produces a signal indicative of the time at which each said passage occurs, said signal comprising a disturbance in said standing wave;

(b) monitoring said signal; and (c) analyzing said signal to detect vibrations of said blades.

5. A method for monitoring turbine blade vibrations, comprising the steps of:

(a) producing a travelling continuous wave in a waveguide having an aperture positioned adjacent a rotating row of blades, wherein each passage of an individual blade tip past said aperture produces a signal indicative of the time at which each said passage occurs, said signal comprising a reflected wave;

(b) monitoring said signal; and (c) analyzing said signal to detect vibrations of said blades.

6. A system for monitoring turbine blade vibrations, comprising:

(a) a microwave transmitter transmitting continuous wave energy;

(b) a waveguide having a first aperture coupled to said transmitter and a second aperture positioned adjacent a rotating row of blades, wherein each passage of an individual blade tip through the path of said continuous wave produces a signal indicative of the time at which each said passage occurs; and (c) analyzing means for analyzing said signal to detect vibrations of said blades.

7. A system as recited in claim 6, wherein a reflected wave is produced when a blade tip is adjacent an aperture of said waveguide; wherein a standing wave is produced by an interaction of the transmitted wave with the reflected wave; and wherein said signal comprises a disturbance in said standing wave resulting from the passage of said blade tip past said aperture.

8. A system as recited in claim 6, wherein a reflected wave is produced when a blade tip is adjacent an aperture of said waveguide; and wherein said analyzing means comprises means for measuring said reflected wave.

9. A system as recited in claim 6, wherein said signal comprises a voltage versus time waveform having a plurality of peaks, each peak corresponding in time to the passage of a blade tip through the path of said continuous wave; and wherein said analyzing means comprises means for detecting vibrations on the basis of the time interval between at least two peaks.

10. A method as recited in claim 9, wherein said continuous wave is transmitted through the air by an antenna toward said rotating row of blades; wherein a reflected wave is produced when a blade tip is adjacent an aperture of said waveguide; and wherein said signal comprises said reflected wave.

* * * * *